United States Patent
Qiao et al.

(10) Patent No.: US 12,197,585 B2
(45) Date of Patent: Jan. 14, 2025

(54) MACHINE LEARNING BASED VULNERABLE TARGET IDENTIFICATION IN RANSOMWARE ATTACK

(71) Applicant: International Business Machines Corporation, Armonk, NY (US)

(72) Inventors: Mu Qiao, Belmont, CA (US); Wenqi Wei, Atlanta, GA (US); Eric Kevin Butler, San Jose, CA (US); Divyesh Jadav, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 532 days.

(21) Appl. No.: 17/113,464

(22) Filed: Dec. 7, 2020

(65) Prior Publication Data

US 2022/0179964 A1 Jun. 9, 2022

(51) Int. Cl.
| | | |
|---|---|---|
| *G06F 21/57* | (2013.01) | |
| *G06F 16/901* | (2019.01) | |
| *G06F 18/214* | (2023.01) | |
| *G06F 21/55* | (2013.01) | |
| *G06F 21/56* | (2013.01) | |
| *G06N 20/00* | (2019.01) | |

(52) U.S. Cl.
CPC ........ *G06F 21/577* (2013.01); *G06F 16/9024* (2019.01); *G06F 18/214* (2023.01); *G06F 21/552* (2013.01); *G06F 21/561* (2013.01); *G06N 20/00* (2019.01)

(58) Field of Classification Search
CPC .. G06F 21/577; G06F 16/9024; G06F 18/214; G06F 21/552; G06N 20/00
See application file for complete search history.

(56) References Cited

U.S. PATENT DOCUMENTS 9,516,053 B1 * 12/2016 Muddu .................. G06F 3/0484
10,055,582 B1 * 8/2018 Weaver ................. G06F 21/562
(Continued)

OTHER PUBLICATIONS

Exabeam, "The Anatomy of a Ransomware Attack", Threat Report, 2016, 13 pages.

(Continued)

*Primary Examiner* — Shin-Hon (Eric) Chen
*Assistant Examiner* — Thomas A Carnes
(74) *Attorney, Agent, or Firm* — Scully, Scott, Murphy & Presser, P.C.; Caleb Wilkes

(57) ABSTRACT

A processor can be configured to receive data associated with, and/or access to, a computing system's file system structure. The processor can also be configured to determine file patterns, file path patterns and/or graph patterns associated with the computing system. The processor can also be configured to build a graph structure having nodes and edges, the graph structure representing the file patterns, file path patterns and graph patterns, wherein the nodes of the graph structure represent files and attributes of the files and the edges of the graph structure represent connectivity between the files. The processor can also be configured to train, based on the graph structure, a first machine learning model to learn a feature vector associated with a file. The processor can also be configured to train, based on the feature vector, a second machine learning model to identify a vulnerable ransomware target.

9 Claims, 11 Drawing Sheets

(56) References Cited

U.S. PATENT DOCUMENTS

| | | | |
|---|---|---|---|
| 10,609,079 B2 | 3/2020 | Crabtree et al. | |
| 10,664,619 B1 | 5/2020 | Marelas | |
| 10,673,903 B2 | 6/2020 | Chesla et al. | |
| 10,893,068 B1* | 1/2021 | Khalid | G06F 21/554 |
| 11,238,176 B1* | 2/2022 | Vax | G06F 16/2457 |
| 2010/0211924 A1* | 8/2010 | Begel | G06F 16/904 |
| | | | 707/E17.069 |
| 2017/0169230 A1* | 6/2017 | Zheng | G06N 20/00 |
| 2018/0288087 A1* | 10/2018 | Hittel | G06F 21/6218 |
| 2019/0319987 A1* | 10/2019 | Levy | G06F 16/93 |
| 2019/0347418 A1 | 11/2019 | Strogov et al. | |
| 2020/0076835 A1* | 3/2020 | Ladnai | G06N 5/022 |
| 2020/0204589 A1* | 6/2020 | Strogov | H04L 63/1416 |
| 2020/0301892 A1* | 9/2020 | Florin | G06N 3/08 |
| 2020/0342116 A1* | 10/2020 | Agarwal | G06N 20/00 |
| 2021/0026961 A1* | 1/2021 | Underwood | G06F 16/9027 |
| 2021/0027133 A1* | 1/2021 | Ludwig | G06F 18/24 |
| 2021/0056211 A1* | 2/2021 | Olson | G06N 3/08 |
| 2021/0084073 A1* | 3/2021 | Crabtree | H04L 63/1441 |
| 2021/0160257 A1* | 5/2021 | Elyashiv | H04L 63/1425 |
| 2021/0294901 A1* | 9/2021 | Agarwwal | H04L 41/145 |

OTHER PUBLICATIONS

Alhawi, O., et al., "Leveraging Machine Learning Techniques for Windows Ransomware Network Traffic Detection", Cyber Threat Intelligence, Advances in Information Security, First Online Apr. 24, 2018, 11 pages, vol. 70.

P-PAEP, "The Future of Ransomware and Social Engineering", 2017 Public-Private Analytic Exchange Program, Aug. 24, 2017, 31 pages.

Anonymous, "Automatic Event-Driven Backup Recommendation Engine in Database Deployments", An IP.com Prior Art Data Base Technical Disclosure, IP.com No. IPCOM000263492D, Sep. 4, 2020, 6 pages.

Anonymous, "Vulnerability Mitigation in a Cloud Environment", An IP.com Prior Art Data Base Technical Disclosure, IP.com No. IPCOM000260267D, Nov. 8, 2019, 4 pages.

Anonymous, "Method and System for Dynamic Identification of Cyber Threats by Ingesting Backup Data", An IP.com Prior Art Data Base Technical Disclosure, IP.com No. IPCOM000258575D, May 24, 2019, 3 pafes.

Scaife, N., et al., "CryptoLock (and Drop It): Stopping Ransomware Attacks on User Data", In 2016 IEEE 36th International Conference on Distributed Computing Systems (ICDCS), Jun. 27-30, 2016, pp. 303-312.

Hammond, D.K., et al., "Wavelets on graphs via spectral graph theory", Applied and Computational Harmonic Analysis 30 (2011), Received Nov. 14, 2009, Revised Apr. 21, 2010, Accepted Apr. 25, 2010, Available online Apr. 28, 2010, pp. 129-150.

Kipf. T.N., et al., "Semi-supervised classification with graph convolutional networks", Published as a conference paper at ICLR 2017, arXiv:1609.02907v4, Feb. 22, 2017, 14 pages.

* cited by examiner

MACHINE LEARNING BASED VULNERABLE TARGET IDENTIFICATION IN RANSOMWARE ATTACK

BACKGROUND

The present application relates generally to computers and computer applications, and more particularly to machine learning, computer security and identifying vulnerable computer targets.

Malware refers to malicious software or code designed to cause damage to data and system components in a computer system and/or network. Malware poses a major threat in cyber security. Ransomware is a type of malware and generally operates by locking the computer such as the desktop of the victim to render the system inaccessible to the user, or by encrypting, overwriting, or deleting the user's files.

Cyber resiliency service provider monitors abnormalities in backup snapshots to detect cyber attacks and breaches. Once an anomaly is spotted, the last clean snapshot can be identified and restored to ensure organizations to resume operations.

Current ransomware detection scanning usually spans over the entire backup snapshot in search of anomalous behavior. In an aspect, such spanning can be computationally expensive, for example, resource-consuming and time-consuming. In addition, current ransomware detections are designed to adapt the attack behavior of existing ransomwares and can hardly generalize to unknown ransomwares. At times, data protection or backup is considered as the last line of defense to a ransomware attack.

BRIEF SUMMARY

The summary of the disclosure is given to aid understanding of a computer system and a method of improving computer security. It should be understood that various aspects and features of the disclosure may advantageously be used separately in some instances, or in combination with other aspects and features of the disclosure in other instances. Accordingly, variations and modifications may be made to the system and/or its method of operation to achieve different effects.

A computer-implemented method and system for identifying vulnerable targets in computer systems can be provided. The method, in an aspect, can include receiving data associated with a computing system's file system structure. The method can also include determining file patterns, file path patterns and graph patterns associated with the computing system, which are susceptible to a ransomware attack. The method can also include building a graph structure having nodes and edges, the graph structure representing the file patterns, file path patterns and graph patterns, wherein the nodes of the graph structure represent files and attributes of the files and the edges of the graph structure represent connectivity between the files. The method can also include training, based on the graph structure, a first machine learning model to learn a feature vector associated with a file. The method can also include training, based on the feature vector, a second machine learning model to identify a vulnerable ransomware target. Advantageously, the method may allow for learning to identify vulnerable targets of an attack, for example, from previously unknown ransomwares, for example, in a focused manner using file or object relationships.

A method, in another aspect, can include receiving data associated with a computing system's file system structure. The method can also include determining file patterns, file path patterns and graph patterns associated with the computing system, which are susceptible to a ransomware attack. The method can also include building a graph structure having nodes and edges, the graph structure representing the file patterns, file path patterns and graph patterns, wherein the nodes of the graph structure represent files and attributes of the files and the edges of the graph structure represent connectivity between the files. The method can also include training, based on the graph structure, a first machine learning model to learn a feature vector associated with a file. The method can also include training, based on the feature vector, a second machine learning model to identify a vulnerable ransomware target. The method can also include deploying the classifier for identifying a future ransomware target. Advantageously, the method may allow for identifying vulnerable targets of an attack, for example, from previously unknown ransomware.

A method, in another aspect, can include receiving data associated with a computing system's file system structure. The method can also include determining file patterns, file path patterns and graph patterns associated with the computing system, which are susceptible to a ransomware attack. The method can also include building a graph structure having nodes and edges, the graph structure representing the file patterns, file path patterns and graph patterns, wherein the nodes of the graph structure represent files and attributes of the files and the edges of the graph structure represent connectivity between the files. The method can also include training, based on the graph structure, a first machine learning model to learn a feature vector associated with a file. The method can also include training, based on the feature vector, a second machine learning model to identify a vulnerable ransomware target. The method can also include triggering the computing system to perform a mitigating action based on the second machine learning model identifying the future ransomware target. Advantageously, the method may allow for mitigating a possible ransomware attack in a focused manner.

A system, in one aspect, can include a processor and a memory device coupled with the processor. The processor can be configured to receive data associated with a computing system's file system structure. The processor can also be configured to determine file patterns, file path patterns and graph patterns associated with the computing system, which are susceptible to a ransomware attack. The processor can also be configured to build a graph structure having nodes and edges, the graph structure representing the file patterns, file path patterns and graph patterns, wherein the nodes of the graph structure represent files and attributes of the files and the edges of the graph structure represent connectivity between the files. The processor can also be configured to train, based on the graph structure, a first machine learning model to learn a feature vector associated with a file. The processor can also be configured to train, based on the feature vector, a second machine learning model to identify a vulnerable ransomware target. Advantageously, the system may allow for learning to identify vulnerable targets of an attack, for example, from previously unknown ransomwares, for example, in a focused manner using file or object relationships.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
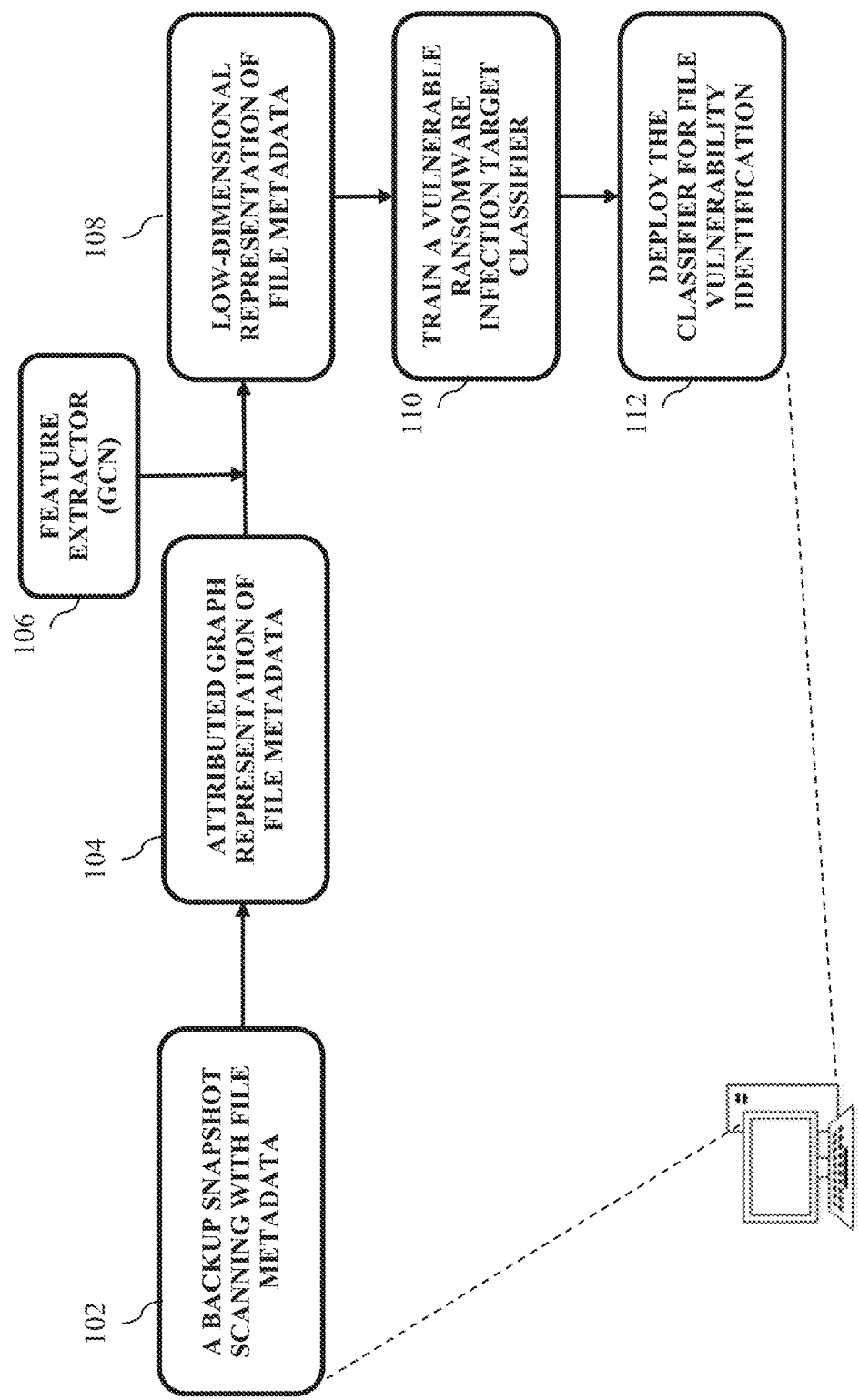
FIG. 1 is a diagram illustrating a method in an embodiment of training a machine learning model to identify cyber attack targets.

Systems, methods, and techniques can be provided in one or more embodiments, which can identify vulnerable targets, e.g., data, files and/or like computer components, in malware attacks such as in ransomware attack. In an embodiment, the systems and methods may implement a machine learning technique for identifying such vulnerable targets. In an embodiment, the systems and methods can identify vulnerable targets of ransomware attack from previously unknown ransomwares.

Ransomware typically locks down networks and locks out users, e.g., using encryption, until a ransom is paid. Given that the goal of ransomware is to collect ransom, the infection target of different ransomwares can have a similar pattern. In one or more embodiments, a machine learning method jointly learns different infection patterns of ransomware to identify files and/or file folders that are prone to be ransomware infection targets. In an embodiment, the method leverages three patterns: file pattern, path pattern and graphical pattern.

Since the goal of ransomware is to ask for ransom, ransomware tends to target files which cannot be recovered by simply rebooting or reinstallation, or which are expendable to users. For example, ransomware tends to target user files considered important to users. Ransomware locates those user-sensitive and highly profitable files as its encryption target.

In an embodiment, a method leverages both the file and path attributes and graphical information in file systems, trains a Graph Convolutional Network (GCN) to learn representation of node attributes (file and path pattern) and connectivity (graphical relation), and then builds a classification model, which identifies vulnerable targets (files and directories) in ransomware attack. For example, file attributes include attributes such as filename, extension, access, and frequency of access; path attributes include attributes such as directories or folder path name containing user files such as user-sensitive data; graphical information include information such as a search strategy of infecting user-sensitive data, which a ransomware may perform on target machines or computers.

In an embodiment, file attributes can include file extensions, for example, which represent file types. Examples of file extensions, which a ransomware tends to attach can include ".pv", ".pvs" ".jpg" ".txt", ".js", ".xml" ".java", ".doc", ".ppt" ".xls" ".pdf" ".png", ".ms". User-sensitive data usually include files in the following formats: e.g., image data such as ".jpg", ".png"; text data such as ".txt", ".doc", ".pdf"; and network cache data such as ".js", ".java", ".xml". Data or files with such extensions can be considered to be targets of cyber attacks (e.g., ransomware).

In an embodiment, path patterns include folder or file directory path, e.g., full path name of a directory or folder. Examples can include one or more directories or folders, which are user-related directories, e.g., folders or directories containing user files or data. Such user related directories can be considered to be targets of cyber attacks (e.g., ransomware). Examples of path names can include "Python27/Lib/", "Users/Administrator/", "users/administrator/pictures/", "Users/Administrator/AppData/Local/XXXOS/Temporary Internet Files/YYY/", etc.

A graphical relation attribute or connectivity attribute can include graphical patterns of infected locations of data in a computer system directory or storage hierarchy. It may be that infected files are concentrated in a few locations. Files in an area of concentration can be considered as possibly vulnerable targets. Another graphical relation attribute can include a search strategy that a possible cyber attack (e.g., ransomware) can use in targeting data. For instance, a search strategy can include depth first infection, ascending order infection and root-to-file infection. For instance, after spotting the files for encryption, ransomware infects the computer system by following different search strategies, e.g., traversal path of directories or folders: Infect files with certain extensions with depth-first search; Infect files in ascending orders; Infect files starting from the root directory and moving down the tree. Files or data identified by such search strategies can be considered targets or vulnerable targets of cyber attacks (e.g., ransomware attack). Files in such traversal path can be considered as possibly vulnerable targets.

To identify targets of cyber attacks (e.g., ransomware attack), the system and/or method in one or more embodiments considers infection pattern, which indicates graphical relation of the ransomware infected files, in addition to considering extension and key words in file directories.

FIG. 1 is a diagram illustrating a method in an embodiment of training a machine learning model to identify cyber attack targets. The method can be a computer-implemented method, computer instructions which one or more processors or one or more hardware processors can read and run. One or more hardware processors, for example, may include components such as programmable logic devices, microcontrollers, memory devices, and/or other hardware components, which may be configured to perform respective tasks described in the present disclosure. Coupled memory devices may be configured to selectively store instructions which can be run by one or more hardware processors.

A processor may be a central processing unit (CPU), a graphics processing unit (GPU), a field programmable gate array (FPGA), an application specific integrated circuit (ASIC), another suitable processing component or device, or one or more combinations thereof. The processor may be coupled with a memory device. The memory device may include random access memory (RAM), read-only memory (ROM) or another memory device, and may store data and/or processor instructions for implementing various functionalities associated with the methods and/or systems described herein. The processor may run computer instructions stored in the memory or received from another computer device or medium.

At 102, a computer file system or backup snapshot of a computer data and storage or directory structure is taken or received, and then scanned. For instance, the scanning of a snapshot can show a hierarchical structure of directory and file paths, and also attributes or metadata associated with files and directories.

At 104, a tree representation of the computer file system is generated to include file metadata. For instance, an attributed graph representation including file and path attributes are generated. For instance, data files are represented graphically, for example, as a tree representation having nodes and edges connecting the edges.

Figure 2A:
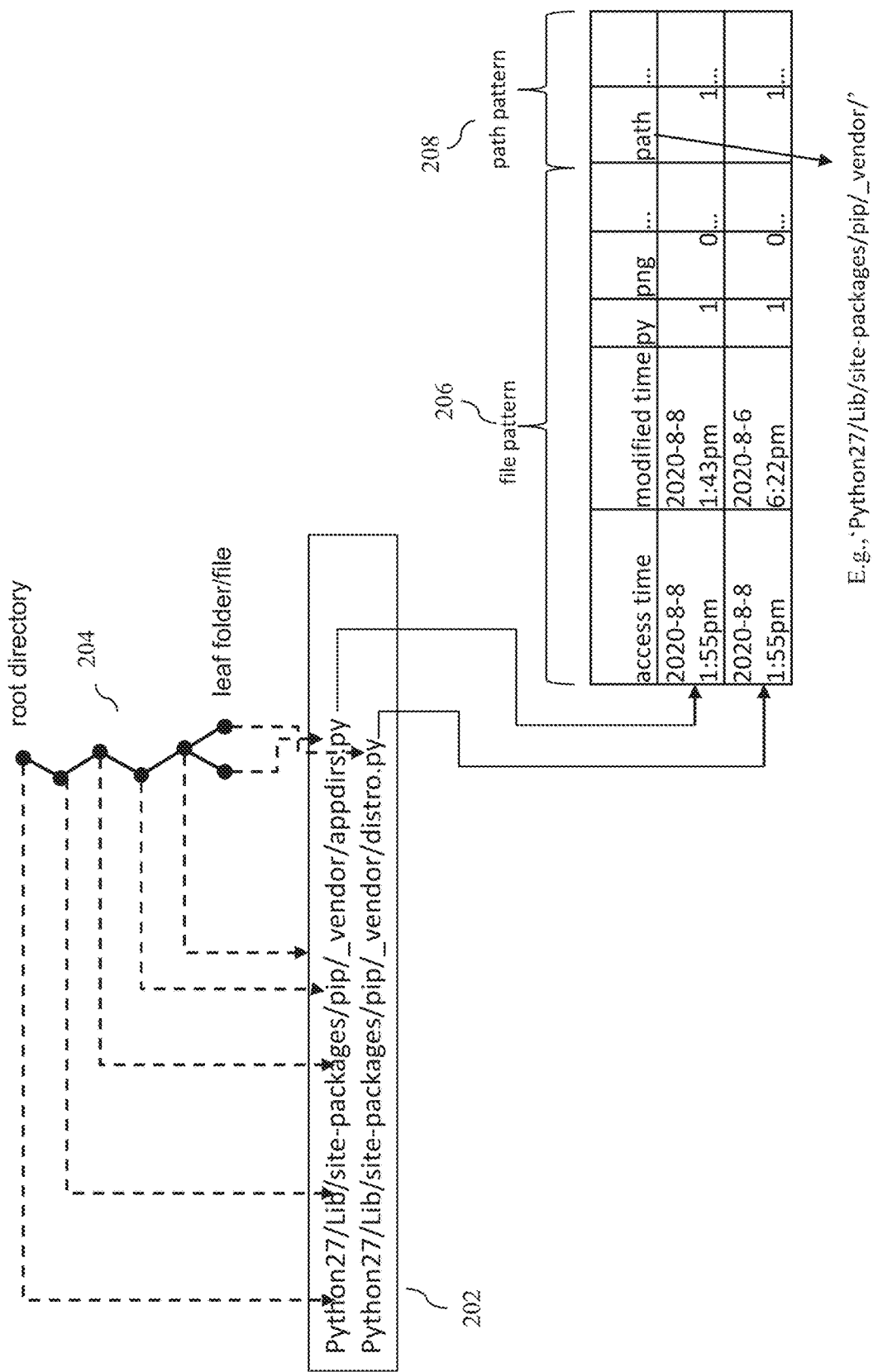
FIG. 2A shows generating a graphical relation or connectivity attribute structure used in machine learning in an embodiment.

FIG. 2A shows a graphical relation or connectivity attribute structure in an embodiment. Files directories 202 in a snapshot can be modeled as an attributed tree graph 204 where each file/folder can be considered as a node and the (high-level folder, low-level folder), (folder, file) relation can be considered as edge. File pattern 206 and path pattern 208, e.g., name, extension, access, frequency, and words in the directory are considered as node attributes.

Referring to FIG. 1, at 106, the method includes learning a feature vector based on the graph representation generated at 104. In an embodiment, a Graph Convolutional Network (GCN) is trained to learn to extract a feature vector from the attributed graph representation. Feature extraction, for example, includes representation learning. GCN is a method to process non-Euclidean data such as graph data with two types of features: Node feature which include attributes of the node; and Structure feature which includes connectivity of the node in the form of edge. A graph can represent relationships between nodes (e.g., files/directories) and represent that structure (e.g., directory structure). GCN generates feature representation that describes the above two types of features, which can be a low-dimensional representation and can be used for downstream applications.

GCN directly learns representation of the node attribute and connectivity (e.g., hierarchical relation), and can learn the relative importance of these two aspects in ransomware infection. In an embodiment, GCN transforms the graph from vertex domain to spectral domain and applies spectral inner product for vertex convolution to avoid complex convolution operation in the vertex domain.

Figure 2B:
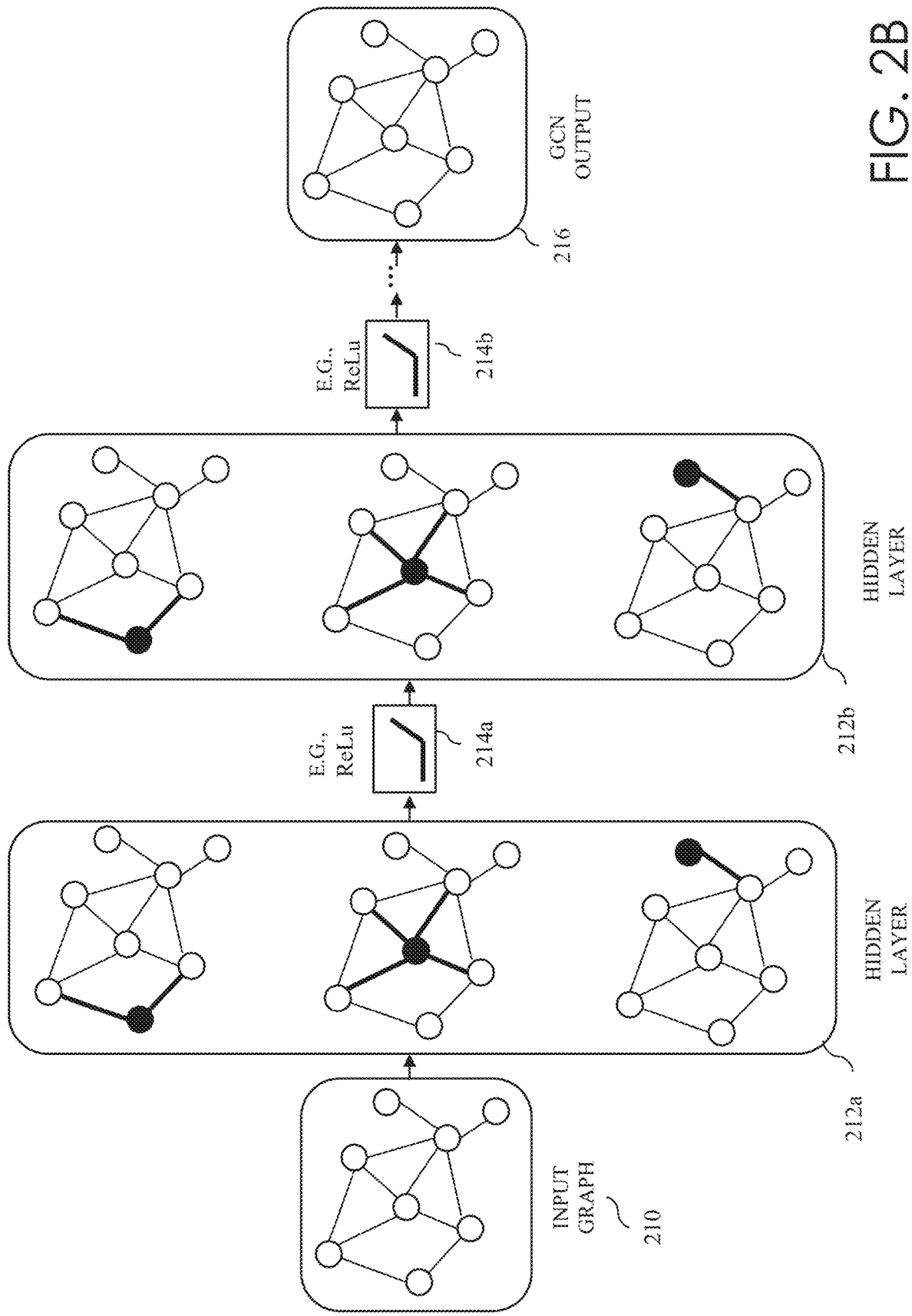
FIG. 2B illustrates GCN architecture in an embodiment.

FIG. 2B illustrates GCN architecture in an embodiment. The model architecture can be deeper with more hidden layers added. A graph convolutional network (GCN) is a neural network that operates on graphs. In an embodiment, for example, given a graph G=(V, E), a GCN takes as input: (1) an input feature matrix X, which is of dimension N×$F^0$, where N is the number of nodes (e.g., the number of directories or files), $F^0$ is the number of input features for each node (e.g., file pattern 206 and/or path pattern 208); (2) an N×N matrix representation of the graph structure such as the adjacency matrix A of G (e.g., if one folder or file belongs to another higher-level folder, there can be an edge connecting the two corresponding representing nodes; As another example, if two folders share the same high-level parent folder, there can be an edge connecting the two descendent folders). Input graph is shown at 210.

In an embodiment, a hidden layer in the GCN can be written as $H^0=f(H^{i-1}, A)$, where $H^0=X$ and $f$ is a propagation rule function. Each layer $H^i$ corresponds to a N×$F^i$ feature matrix where each row is a feature representation of a node. At each layer (e.g., 212a, 212b, ...), the propagation rule function $f$ is used to aggregate the features to form the features in the next layer. To make the aggregated representation of a node include its own features, the method in an embodiment can add a self-loop to each node by adding the identity matrix I to the adjacency matrix A before applying the propagation rule. For example, $\hat{A}=A+I$. The feature representations can also be normalized by node degree by transforming the adjacency matrix A through multiplying it with the inverse degree matrix D. For example, $\hat{A}=D^{-1}A$.

Different propagation rule function $f$ can be used, which lead to different variants of GCN. For example, one simple propagation rule can be $f(H^i, A)=\sigma(AH^iW^i)$, where $W^i$ is the weight matrix of layer i, and $\sigma$ is a non-linear activation function, such as the rectified linear unit (ReLu) function (e.g., 214a, 214b, ...). The weight matrix is of dimension $F^i \times F^{i+1}$. The size of the second dimension of the weight matrix determines the number of features at the next layer. In another embodiment, $f$ can be a spectral propagation rule, e.g., $$f = \sigma\left(D^{-\frac{1}{2}} \hat{A} D^{-\frac{1}{2}} X W\right).$$

In an embodiment, assuming the total number of layers is n, the final output of the GCN 216 is a matrix of dimension N×$F^n$. In an embodiment, the dimensionality of the output feature representations $F^n$ is controlled by the hidden-to-output weight matrix $W^n$, which is of dimension $F^{n-1} \times F^n$.

A graph convolutional network can have one or more convolution layers (e.g., 212a, 212b, ...). At each convolution layer, data can be convolved (or forward propagated) using input features (node features) and an adjacency matrix, for example, similar to a filter in a convolutional neural network, and passed through an activation function (e.g., 214a, 214b, ...). A graph convolution network takes the input data (e.g., node information of the graph structure) (e.g., 210) and convolves the input data using an adjacency matrix and passes the convolved data through an activation function such as (but not limited to) a rectified linear unit (ReLu) function (e.g., 214a, 214b, ...). An adjacency matrix can represent the connectivity between the nodes in the graph structure. Incorporating the adjacency matrix allows the graph convolutional network to learn features based on node connectivity as well as the input features of the node. The graph convolutional network outputs a feature vector (e.g., 216) associated with a file or directory.

Referring back to FIG. 1, at 108, a k-dimensional representation of file metadata, a feature vector, is created. For instance, each row of the feature vector represents a directory or a file with full path. Each column of the feature vector specifies an attribute or degree of attribute associated with that directory or file, for example, file metadata. The feature vector can also be considered as an embedding for that directory or file, which is generated by the GCN. The dimension k can be a user specified hyperparameter of the GCN. For instance, each directory or file can have a feature vector expressed in k-dimensions (e.g., columns). An example of k can be 100. Another dimension can be specified by the user. The number of rows in the feature vector can depend on the number of directories and/or files being considered for training.

For example, the method in one or more embodiments leverages both the file and path attributes and graphical information in file systems, trains a Graph Convolutional Network (GCN) to learn low dimensional representation of node attributes (file and path pattern) and connectivity (graphical relation), and then builds a classification model.

At 110, using the k-dimensional representation of file metadata, a classifier is trained to identify a vulnerable ransomware infection target. For example, the classifier can be a binary classifier. For instance, the classifier can be a logistic regression model. Briefly, logistic regression uses sigmoid function and can provide categorical outcomes, e.g., whether a file is vulnerable to a cyber attack or not. Training a logistic regressing can include setting a decision boundary, computing and optimizing a cost function. Another type of classifier can be trained.

At 112, the trained classifier can be deployed for file vulnerability identification. For instance, the trained classifier can be deployed on any computer system to detect or identify one or more files located in that computer system which may be vulnerable to a ransomware attack, for example, even by a previously unknown ransomware.

Figure 3:
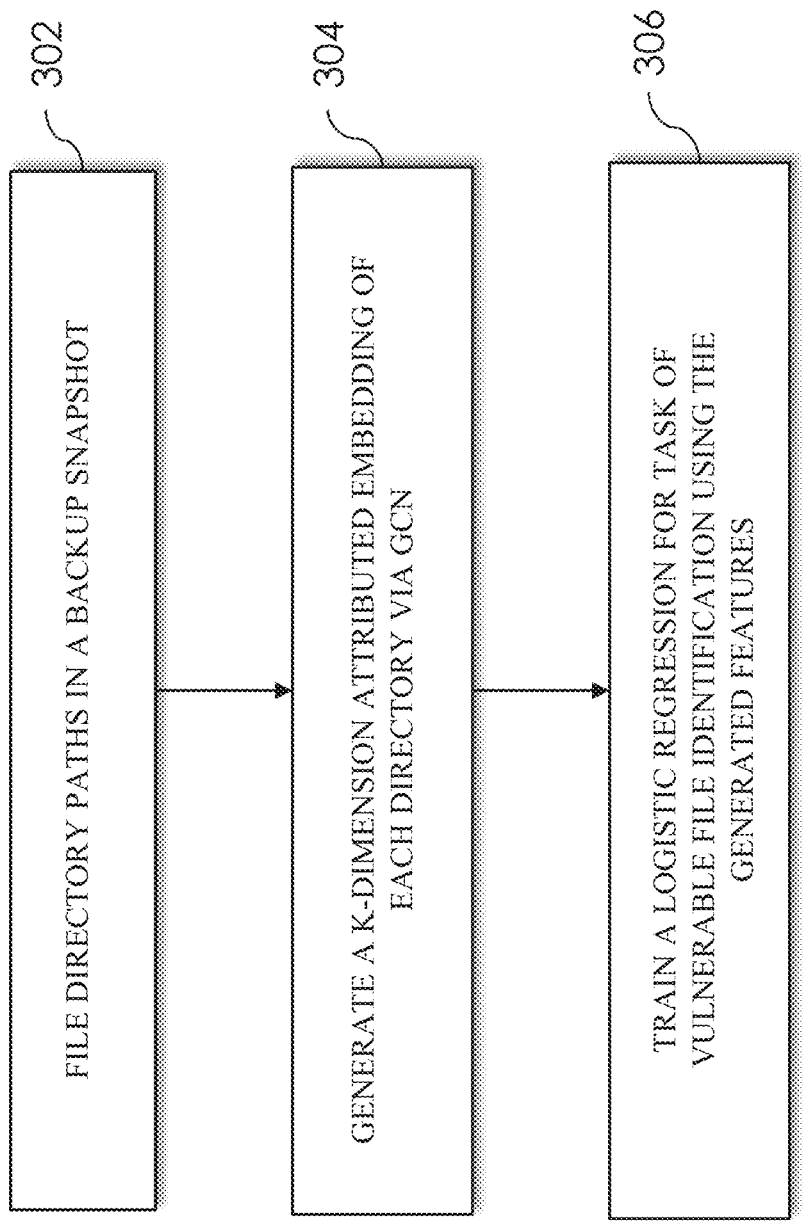
FIG. 3 is another diagram illustrating a method in an embodiment.

FIG. 3 is another diagram illustrating a method in an embodiment. The method can be implemented and/or run on one or more hardware processors. At 302, file directory path and associated information or attributes can be received. For instance, a backup snapshot of a file directory path can be taken or received, from which attributes are determined. A graph or tree representation of the file directory path can be created, for example, with nodes of the graph corresponding to a file or directory in the file directory path and edges representing the file directory structure. A node also includes or specifies a plurality of attributes associated with the file represented by that node.

At 304, using GCN, a k-dimension attributed embedding (e.g., feature vector) of each directory in the file directory path is created or generated. For example, a row of a feature vector represents a directory and the k columns can represent a feature or attribute about that directory. "k", for example, is a configurable hyperparameter of the GCN, and can be input by a user.

At 306, a classifier such as a logistic regression classifier can be trained based on the k-dimension attributed embedding to identify whether a given directory path is a vulnerable target for a cyber attack such as a ransomware attack. Another type of machine learning classifier, for example, a binary classifier, other than a logistic regression classifier, can be trained.

The trained classifier can be deployed, for example, for inferencing. For example, given a previously unseen directory path, the classifier is able to predict or classify whether that directory path is vulnerable to a cyber attack. For instance, in working or inference phase, input to the classifier can include a file directory path. The classifier outputs whether that input directory path is prone to be a ransomware infection target. For instance, the output of the classifier can be a classification as to whether the input path is a vulnerable target.

The method can be integrated into a cyber-resiliency tool and may accelerate the ransomware detection process. The method can estimate potential infection regions of unknown ransomware attacks and provide defensibility for future cyber attacks in computer systems, for example, including those in a cloud environment. By identifying vulnerable targets, cyber resiliency service providers can make more efficient data backup policies such as offering extra protection for a certain regions of files.

Figure 4:
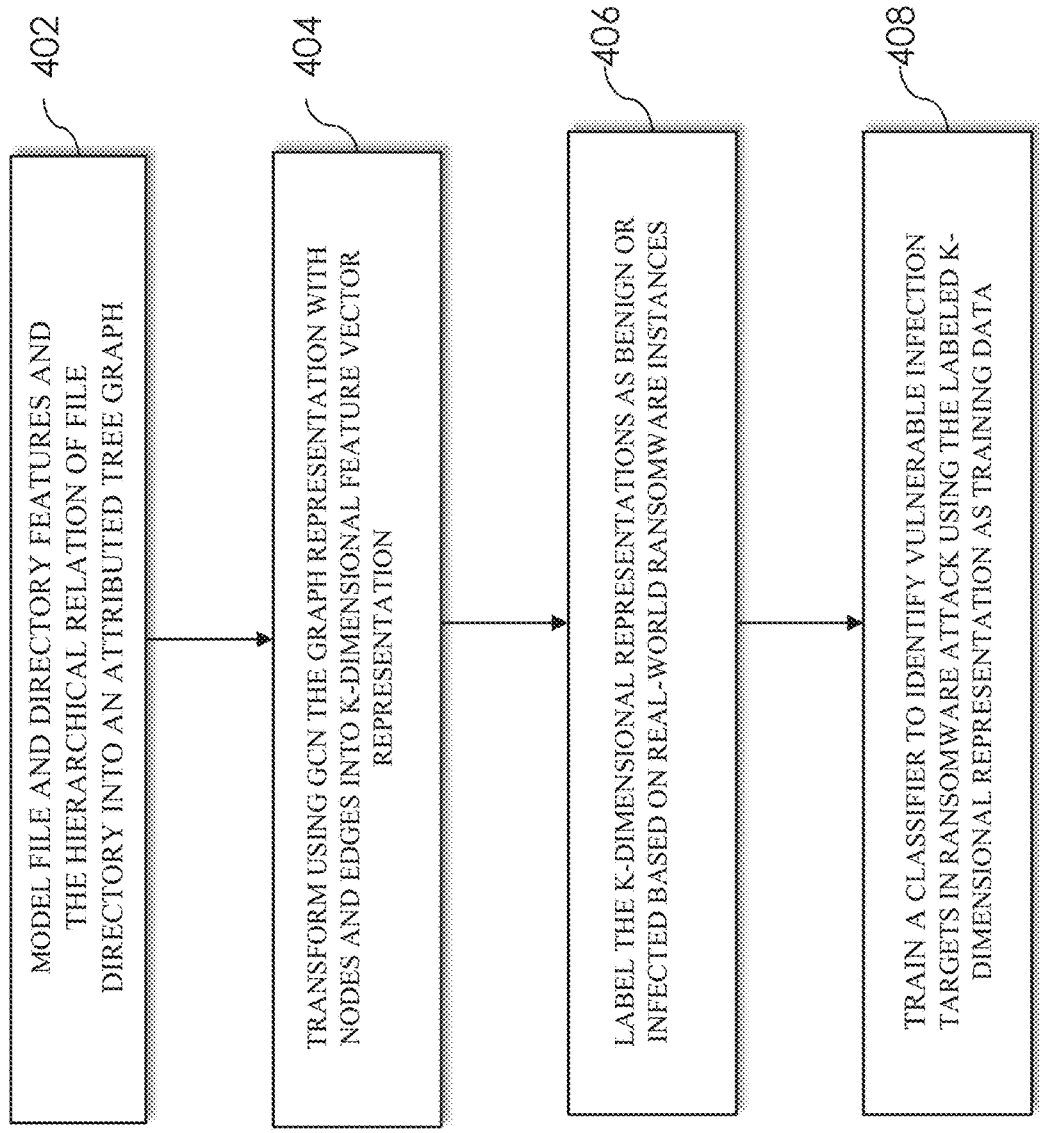
FIG. 4 is another diagram illustrating a method in an embodiment.

FIG. 4 is another diagram illustrating a method in an embodiment. The method can be a computer-implemented method implemented to identify vulnerable infection targets in cyber attacks such as a ransomware attack. At 402, the method may include modeling a file and directory features and the hierarchical relation of file directory into an attributed tree graph.

At 404, the method can include applying graph convolutional networks to transform the graph representation with nodes (file/folder features) and edges (the hierarchical relation) into a low-dimensional (e.g., k-dimensional) feature vector representation. "k" can be configurable and can be predefined and/or input by a user.

At 406, the method can include labeling the low-dimensional representations as benign or infected based on real-world ransomware instances. For example, the low-dimensional representation can be created for a plurality of directories and/or files, which can be those that are known to be prone to infections and those known to be benign or not prone to infections. For instance, a training data set can include a number of infected files and a number of benign files. By way of example, the training data set needs not to be balanced between the two types of files and can be skewed. For example, there can be less than 10,000 infected files and greater than 100,000 benign files. A logistic regression and/or another classifier can be trained under such skewed raw data circumstances and/or under balanced data samples. For highly skewed data, a down sampling method may be applied to sample a sub-set of data points from the majority class and create a balanced training data set.

At 408, the method can include training a classifier to identify vulnerable infection targets in ransomware attack using the labeled low-dimensional representation as training data. The classifier can be deployed to identify whether an input directory path would be vulnerable to a ransomware attack, for example, from a previously unknown ransomware.

In another aspect, a method of using a computing device to identify vulnerabilities to a ransomware attack can include receiving by a computing device data or information associated with, or access to, a computing system which may be susceptible to a ransomware attack. The method can also include accessing or determining by the computing device file patterns, file path patterns, and graph patterns associated with the computing system which may be susceptible to the ransomware attack. The method can further include training by the computing device a machine learning model considering the file patterns, file path patterns, and graph patterns associated with the computing system. The method can also include, using by the computing device the trained machine learning model to identify vulnerabilities in the computing system which may be susceptible to a ransomware attack. The method can further include displaying or presenting by the computing device the vulnerabilities to the user. Automatic, semi-automatic, or manual mitigating actions can be taken based on the identified vulnerabilities in the computing system such as increasing protection mechanisms on those files, directories or components of the computing system, increasing the frequency of the backup of those files, directories or components of the computing system, and/or others. In an aspect, the method can also include using the identified vulnerabilities to reduce a requirement for backup storage in the computer system. For example, the data in the computer system which may not be susceptible to the ransomware attack can be backed up less frequently or on low-cost storage media. In addition, the method can also be used to reduce or narrow down the scanning scope of existing ransomware detection tools on the backup data (e.g., focus the scanning on the backup data which are identified as susceptible to ransomware infections), therefore accelerate the entire ransomware detection process.

Figure 5:
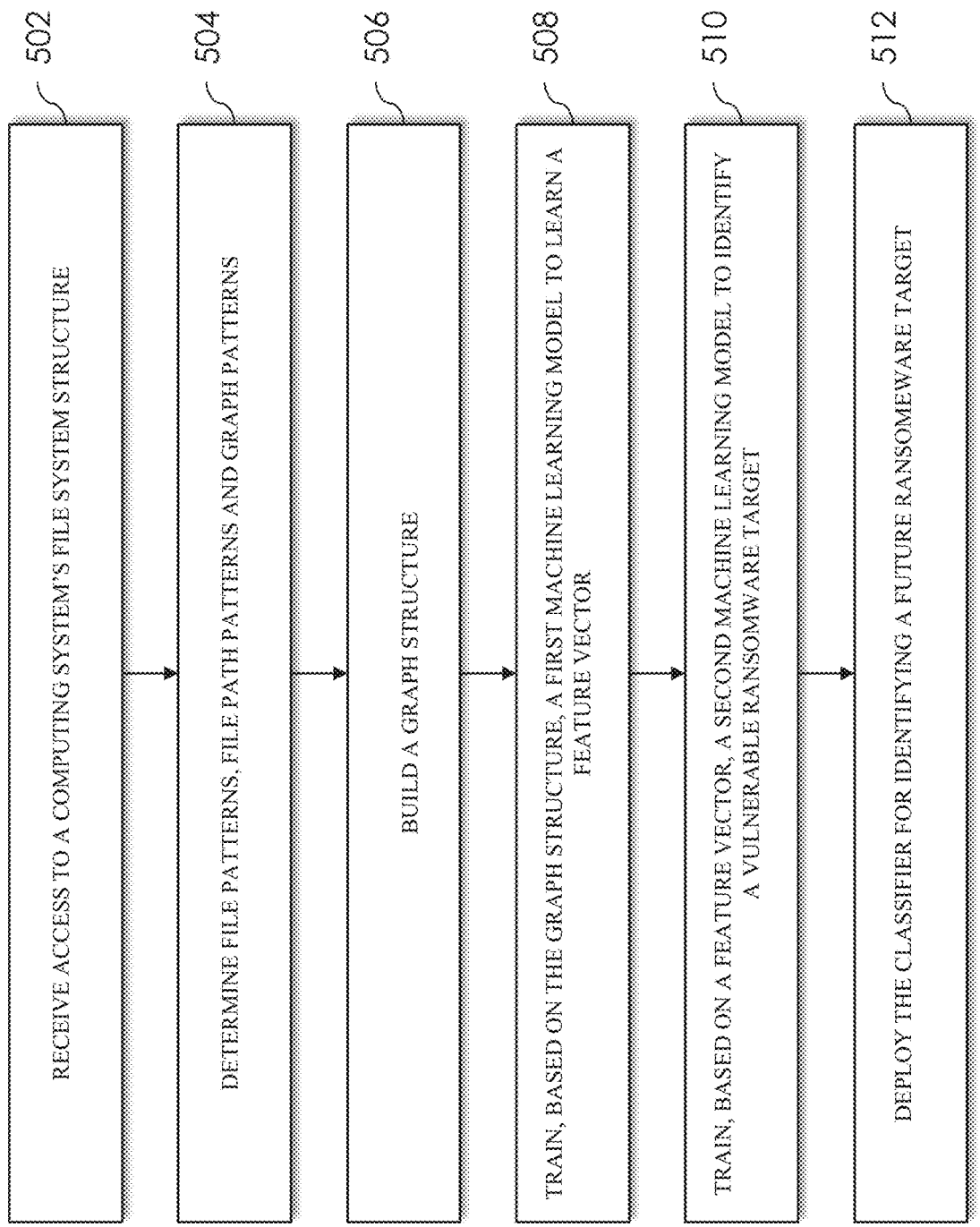
FIG. 5 is another flow diagram illustrating a method of identifying vulnerabilities to a ransomware attack in an embodiment.

FIG. 5 is another flow diagram illustrating a method of identifying vulnerabilities to a ransomware attack in an embodiment. One or more hardware processors may implement and/or run the method. Advantageously, the method may allow for learning to identify vulnerable targets of an attack, for example, from previously unknown ransomwares, for example, in a focused manner using file or object relationships. At 502, the method can include receiving data or information associated with, or access to, a computing system's file system structure. For example, a snapshot of a backup storage including the file or directory structure of the backup can be received.

At 504, the method can include, for example, based on the snapshot of the backup storage and/or access to the computing system's file system structure, determining file patterns, file path patterns and graph patterns associated with the computing system, for instance, those which are susceptible to a ransomware attack. File patterns can include attributes about a file such as access date, modification date, file extension, file name, frequency of access, and/or others. File path patterns can include the full path name of a file. Graph patterns can include how files or directories are connected with each other in a file system (e.g., a hierarchical storage or directory relationship, represented by an adjacency matrix). Graph patterns can indicate locations where infected files are concentrated and search paths of infecting files.

At 506, the method can include building a graph structure having nodes and edges, the graph structure representing the file patterns, file path patterns and graph patterns. The nodes of the graph structure represent files and attributes of the files; the edges of the graph structure represent connectivity between the files, e.g., a hierarchical storage or directory relationship.

At 508, the method can include training, based on the graph structure, a first machine learning model to learn a feature vector associated with a file. The first machine learning model can be a graph convolutional network. The graph convolutional network learns a feature vector from the node attributes and graph connectivity (how the nodes are connected as represented by the edges) of the graph structure. For example, the graph convolutional network transforms the attributes of the files and connectivity between the files into a feature vector associated with each of the nodes in the graph structure. The feature vector can be a k-dimensional representation of node features and structure features of the graph structure. "k" is a hyperparameter of the graph convolutional network and is configurable, and can be user-defined.

A graph convolutional network is a neural network and can have one or more convolution layers. At each convolution layer, data can be convolved (or forward propagated) using input features (node features) and an adjacency matrix, for example, similar to a filter in a convolutional neural network, and passed through an activation function. A graph convolution network takes the input data (e.g., node information of the graph structure) and convolves the input data using an adjacency matrix and passes the convolved data through an activation function such as (but not limited to) a ReLu function. An adjacency matrix can represent the connectivity between the nodes in the graph structure. Incorporating the adjacency matrix allows the graph convolutional network to learn features based on node connectivity as well as the input features of the node. The graph convolutional network outputs a feature vector associated with a file or directory.

At 510, the method can include training, based on a feature vector output by the first machine learning model, a second machine learning model to identify a vulnerable ransomware target. In an embodiment, the second machine learning model includes a classifier and can be a logistic regressions model or another binary classifier. Briefly, logistic regression uses sigmoid function and can provide categorical outcomes, e.g., whether a file is vulnerable to a cyber attack or not. Training a logistic regression can include setting a decision boundary, computing and optimizing a cost function. Another type of classifier can be trained.

At 512, the method can further include deploying the classifier for identifying a future ransomware target. Advantageously, the method may allow for identifying vulnerable targets of an attack, for example, from previously unknown ransomware. In an aspect, the method can also include triggering the computing system to perform a mitigating action based on the second machine learning model identifying the future ransomware target. Advantageously, the method may allow for mitigating a possible ransomware attack in a focused manner. An example of the mitigating action can include increasing security checks on the identified future ransomware target. Other one or more mitigating actions can be taken or performed.

The method in one aspect can capture the topological and/or graphical information of ransomware infections. The method in another aspect can separately learn the file and path attribute features and graphical features, and integrate the contribution of each component for identifying future vulnerabilities.

Figure 6:
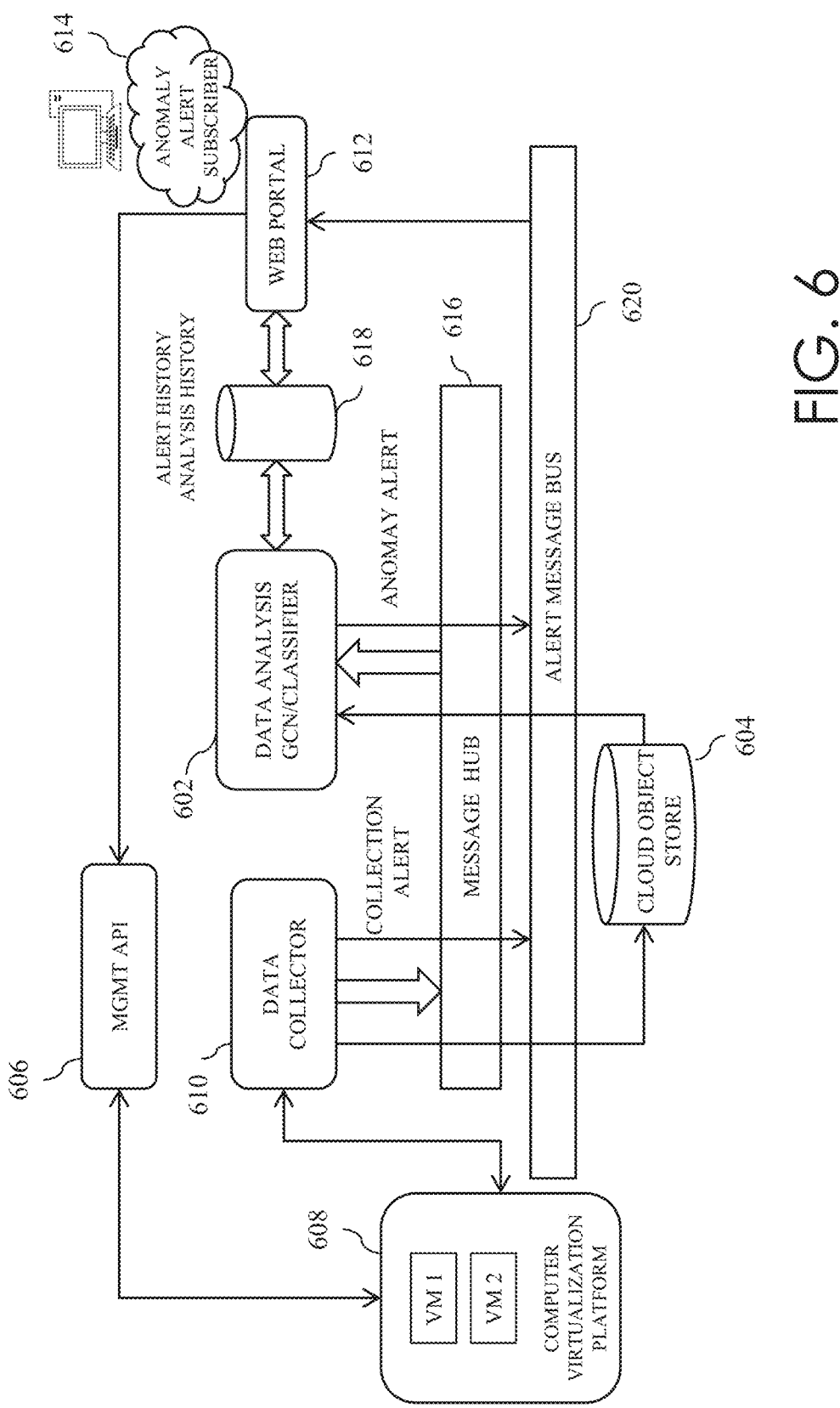
FIG. 6 is a diagram illustrating a computing environment in an embodiment, in which a method of identifying a vulnerable cyber attack or ransomware target can be implemented and/or deployed.

FIG. 6 is a diagram illustrating a computing environment in an embodiment, in which a method of identifying a vulnerable cyber attack or ransomware target can be implemented and/or deployed. The components shown include computer-implemented components, for instance, one or more computer processors and or software component implemented and/or run on one or more hardware processors. By way of example, the method can be employed in a cloud environment, wherein a component 602 may run the method in the cloud environment and detect possible vulnerability in data object store 604 in the cloud environment or another computer. For instance, a classifier built or trained according to the methods described above can be deployed on a data analysis component 602 of a computer system or cloud environment and detect vulnerable targets of a ransomware attack. A management application program interface (API) 606 can be used to deploy or install one or more virtual machines 608 for a client or user. For example, a user may request deployment of one or more virtual machine via a web portal 612, which may invoke a management API 606. The virtual machines 608 use and access data objects in a data object store 604, for example, a cloud object store. For example, a data collector component 610 may collect data accessed by one or more virtual machines 608 and store the data in a data object store 604. A user may also subscribe to an anomaly alert via a web portal 612, for example, over a computer network 614. A data analysis component 602 may run a trained classifier, and/or train a graph convolutional network (GCN) and a classifier using the collected data stored in a data object store 604 for identifying vulnerable ransomware attack targets, for example, as described above. Any anomaly, for example, identified vulnerable target file in the data object store 604 can be sent as an alert to an alert subscriber 614. For instance, the data analysis component 602 may send an alert via an alert bus 620. Alert can be saved or stored on a storage device 618, for example, as history of alerts. The data collector component 610 can send a message on a message hub 616 and the data analysis component 602 can receive a message via the message hub 616. History of alerts can be accessed via the web portal 612.

The methods described above for identifying vulnerable targets of ransomware attacks can be implemented and/or deployed on other computer systems and environments, for instance, and are not limited to those shown in FIG. 6.

Figure 7:
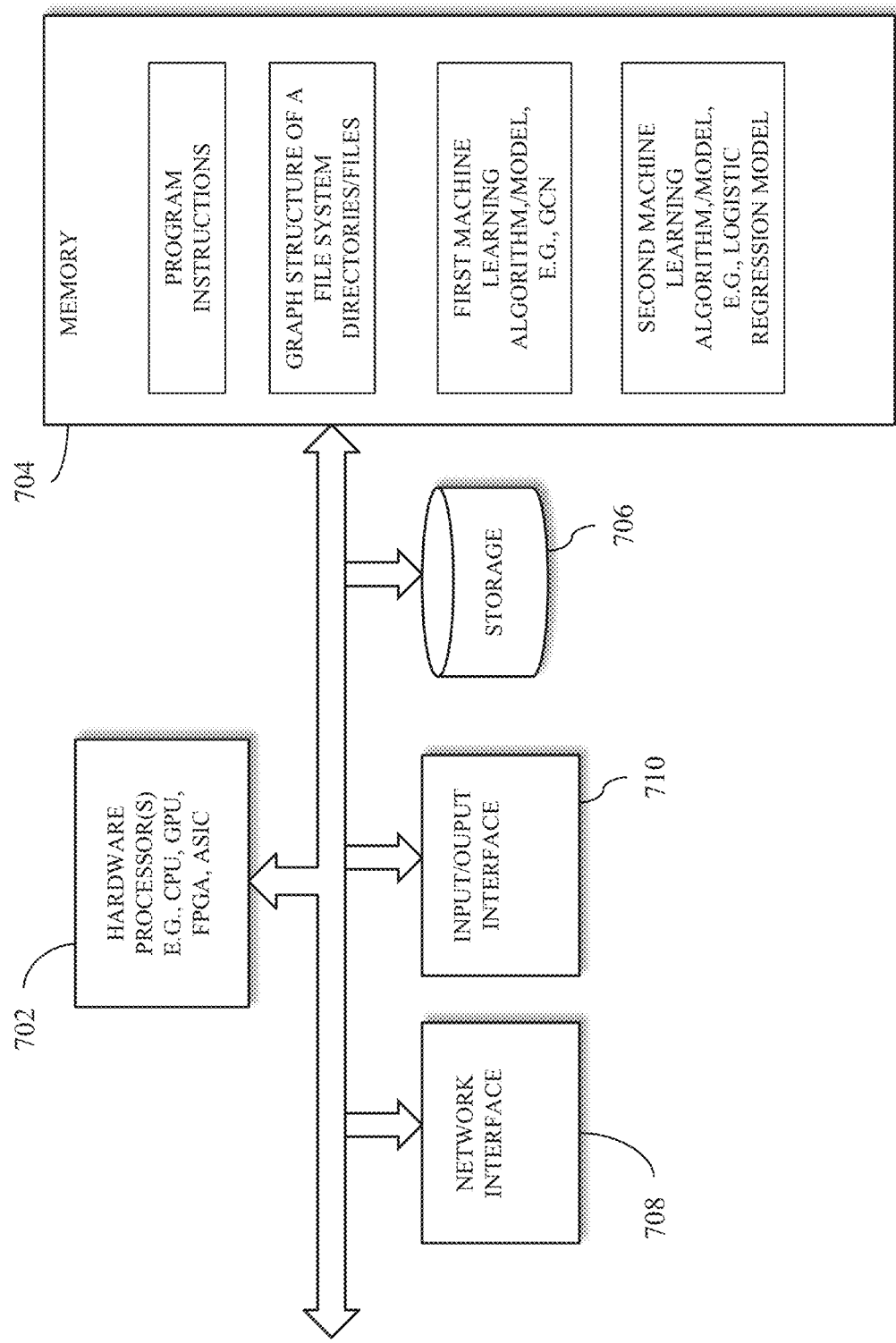
FIG. 7 is a diagram showing components of a system in one embodiment that can train a machine learning model to identify a file vulnerable to a ransomware attack.

FIG. 7 is a diagram showing components of a system in one embodiment that can train a machine learning model to identify a file vulnerable to a ransomware attack. One or more hardware processors 702 such as a central processing unit (CPU), a graphic process unit (GPU), and/or a Field Programmable Gate Array (FPGA), an application specific integrated circuit (ASIC), and/or another processor, may be coupled with a memory device 704, and implement a cyber security measure, e.g., generate a prediction or classification model and identify a target of a cyber or ransomware attack. A memory device 704 may include random access memory (RAM), read-only memory (ROM) or another memory device, and may store data and/or processor instructions for implementing various functionalities associated with the methods and/or systems described herein. One or more processors or hardware processors 702 may execute computer instructions stored in memory 704 or received from another computer device or medium. A memory device 704 may, for example, store instructions and/or data for functioning of one or more hardware processors 702, and may include an operating system and other program of instructions and/or data. One or more hardware processors 702 may receive input including file system structure data, e.g., directories and files, information about the directories and files, and the directory structure. For instance, at least one hardware processor 702 may generate and train a first machine learning model, which can be a graph convolutional network, to learn a feature vector associated with the file system's files, directories and structure. For example, the graph convolutional network transforms a graph structure of the file system files into a feature vector. The graph convolutional network can output a feature vector given a graph structure of a file system file or directory. Based on the feature vectors output by the graph convolutional network, a second machine learning model, e.g., a classifier such as a logistic regression model or another binary classifier, can be trained to classify or predict whether or not a given file is a vulnerable target of a ransomware attack. In one aspect, storage structure data or backup snapshot data can be stored on a storage device 706 or received via a network interface 708 from a remote device, and may be temporarily loaded into a memory device 704 for building or generating the machine learning models. The trained or learned machine learning models can be stored on a memory device 704, for example, for running by one or more hardware processors 702. One or more hardware processors 702 may be coupled with interface devices such as a network interface 708 for communicating with remote systems, for example, via a network, and an input/output interface 710 for communicating with input and/or output devices such as a keyboard, mouse, display, and/or others.

Figure 8:
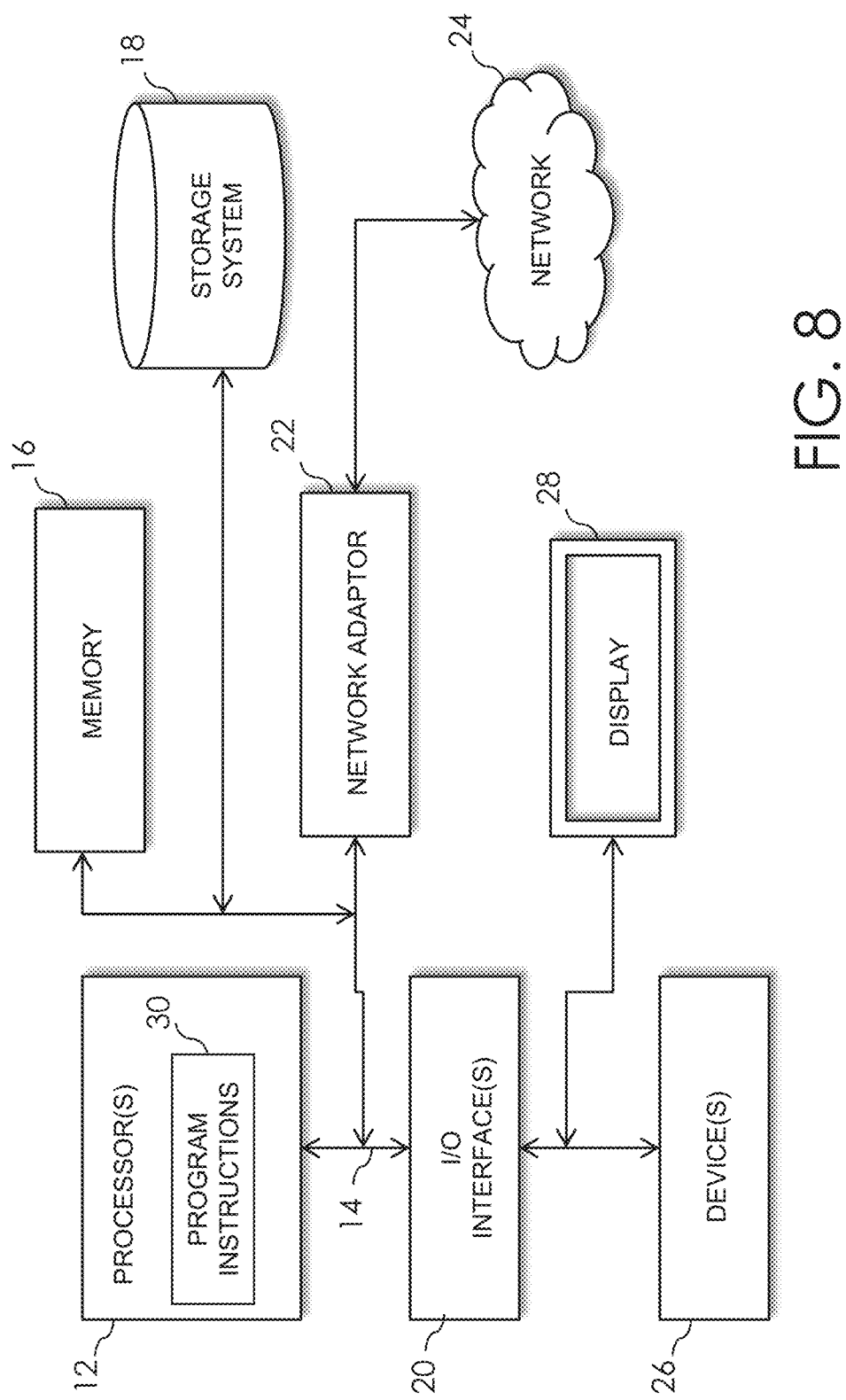
FIG. 8 illustrates a schematic of an example computer or processing system that may implement a system according to one embodiment.

FIG. 8 illustrates a schematic of an example computer or processing system that may implement a system in one embodiment. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 8 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being run by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
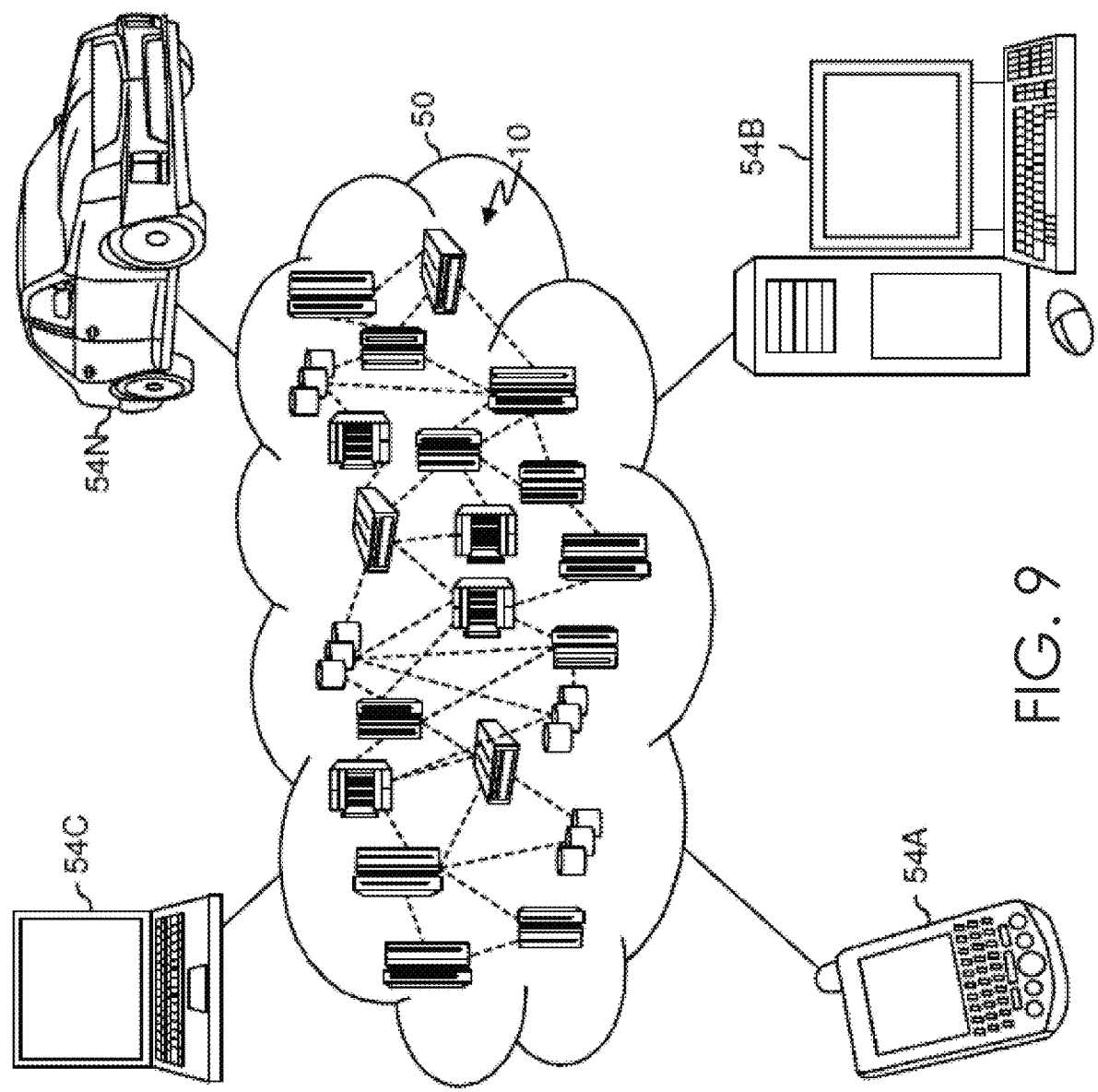
FIG. 9 illustrates a cloud computing environment in one embodiment.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
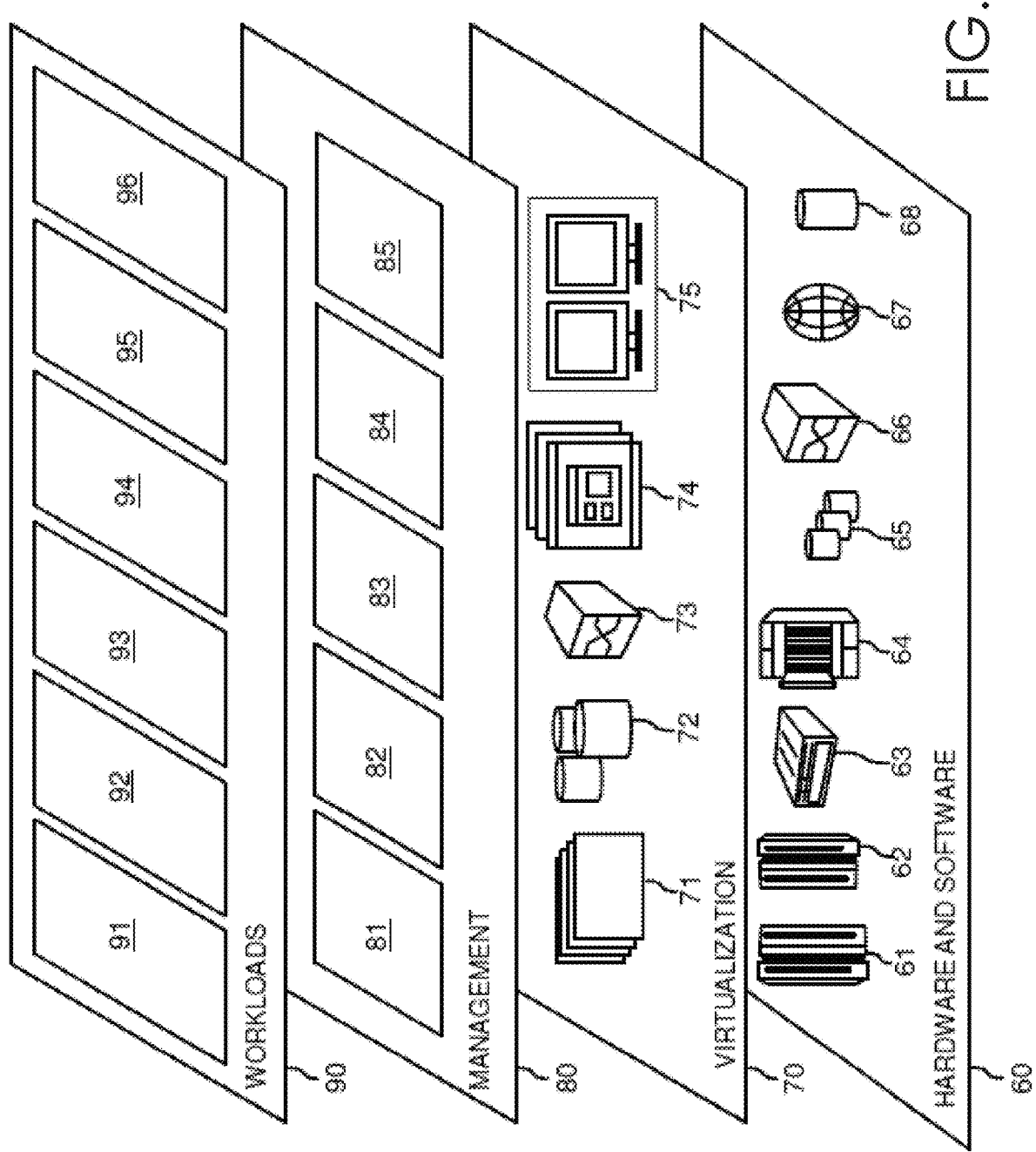
FIG. 10 illustrates a set of functional abstraction layers provided by cloud computing environment in one embodiment of the present disclosure.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and identifying vulnerable targets of ransomware attack processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, run concurrently, substantially concurrently, in a partially or wholly temporally overlapping manner, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof. As used herein, the phrase "in an embodiment" does not necessarily refer to the same embodiment, although it may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:
receiving data associated with a computing system's file system structure;
determining file patterns, file path patterns and graph patterns associated with the computing system, which are susceptible to a ransomware attack, the graph patterns including at least search paths of infecting files in the computer system's file system structure and search strategies of infecting files along travel paths of directories of the computing system's file system structure, the search strategies specifying a graph traversal algorithm which is being used;
building a graph structure having nodes and edges, the graph structure representing the file patterns, the file path patterns and the graph patterns, wherein the nodes of the graph structure represent files and attributes of the files and the edges of the graph structure represent connectivity between the files;
training, based on the graph structure, a first machine learning model to learn a feature vector associated with a file, wherein the first machine learning model learns importance of the file patterns, the file path patterns and the graph patterns in the ransomware attack; and
training, based on the feature vector, a second machine learning model to identify a vulnerable ransomware target;
wherein the first machine learning model includes a graph convolutional network, the graph convolutional network transforming the attributes of the files and the connectivity between the files into a feature vector associated with each of the nodes in the graph structure, wherein the feature vector associated with each of the nodes in the graph structure is a k-dimensional representation of node features and structure features of the graph structure, wherein k is a hyperparameter of the graph convolutional network and is configurable, wherein k is user-defined;

deploy the second machine learning model for identifying a future ransomware target; and trigger the computing system to perform a mitigating action based on the second machine learning model identifying the future ransomware target.

2. The method of claim 1, wherein the mitigating action includes increasing security checks on the identified future ransomware target.

3. The method of claim 1, wherein the second machine learning model includes a classifier.

4. The method of claim 1, wherein the second machine learning model includes a binary classifier.

5. A system comprising:

a processor; and a memory device coupled with the processor, the processor configured to at least:

receive data associated with a computing system's file system structure;

determine file patterns, file path patterns and graph patterns associated with the computing system, which are susceptible to a ransomware attack, the graph patterns including at least search paths of infecting files in the computer system's file system structure and search strategies of infecting files along travel paths of directories of the computing system's file system structure, the search strategies specifying a graph traversal algorithm which is being used;

build a graph structure having nodes and edges, the graph structure representing the file patterns, the file path patterns and the graph patterns, wherein the nodes of the graph structure represent files and attributes of the files and the edges of the graph structure represent connectivity between the files;

train, based on the graph structure, a first machine learning model to learn a feature vector associated with a file, wherein the first machine learning model learns importance of the file patterns, the file path patterns and the graph patterns in the ransomware attack; and train, based on the feature vector, a second machine learning model to identify a vulnerable ransomware target;

wherein the first machine learning model includes a graph convolutional network, the graph convolutional network transforming the attributes of the files and the connectivity between the files into a feature vector associated with each of the nodes in the graph structure, wherein the feature vector associated with each of the nodes in the graph structure is a k-dimensional representation of node features and structure features of the graph structure, wherein k is a hyperparameter of the graph convolutional network and is configurable, wherein k is user-defined;

deploy the second machine learning model for identifying a future ransomware target; and trigger the computing system to perform a mitigating action based on the second machine learning model identifying the future ransomware target.

6. 5, wherein the mitigating action includes increasing security checks on the identified future ransomware target.

7. The system of claim 5, wherein the second machine learning model includes a classifier.

8. The system of claim 5, wherein the second machine learning model includes a binary classifier.

9. A computer program product comprising a computer readable storage medium having program instructions embodied therewith, the program instructions readable by a device to cause the device to:

receive data associated with a computing system's file system structure;

determine file patterns, file path patterns and graph patterns associated with the computing system, which are susceptible to a ransomware attack, the graph patterns including at least search paths of infecting files in the computer system's file system structure and search strategies of infecting files along travel paths of directories of the computing system's file system structure, the search strategies specifying a graph traversal algorithm which is being used;

build a graph structure having nodes and edges, the graph structure representing the file patterns, the file path patterns and the graph patterns, wherein the nodes of the graph structure present files and attributes of the files and the edges of the graph structure represent connectivity between the files;

train, based on the graph structure, a first machine learning model to learn a feature vector associated with a file, wherein the first machine learning model learns importance of the file patterns, the file path patterns and the graph patterns in the ransomware attack; and train, based on the feature vector, a second machine learning model to identify a vulnerable ransomware target;

wherein the first machine learning model includes a graph convolutional network, the graph convolutional network transforming the attributes of the files and the connectivity between the files into a feature vector associated with each of the nodes in the graph structure, wherein the feature vector associated with each of the nodes in the graph structure is a k-dimensional representation of node features and structure features of the graph structure, wherein k is a hyperparameter of the graph convolutional network and is configurable, wherein k is user-defined;

deploy the second machine learning model for identifying a future ransomware target; and trigger the computing system to perform a mitigating action based on the second machine learning model identifying the future ransomware target.

* * * * *